Inventor
H. J. Gaisman
C. Schumacher.

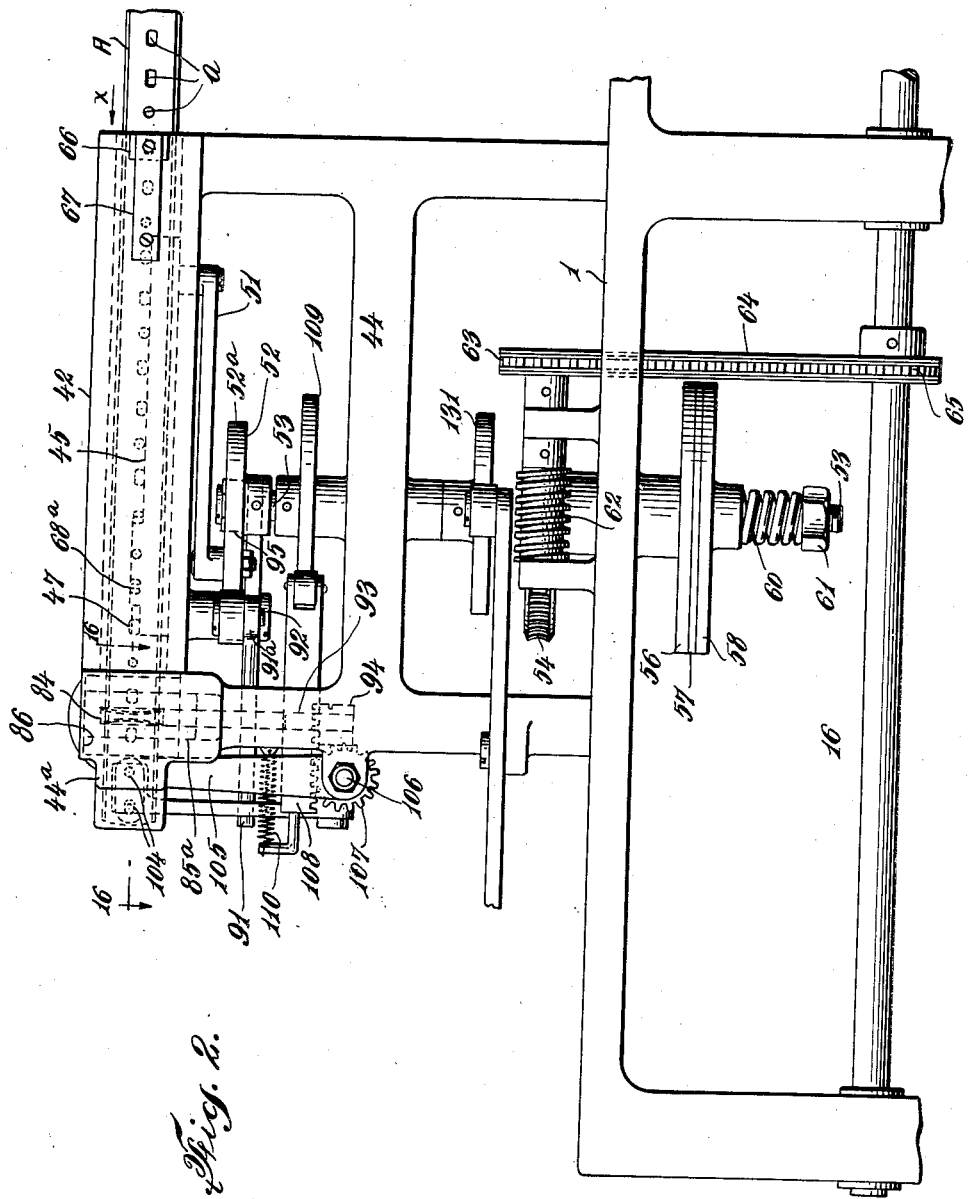

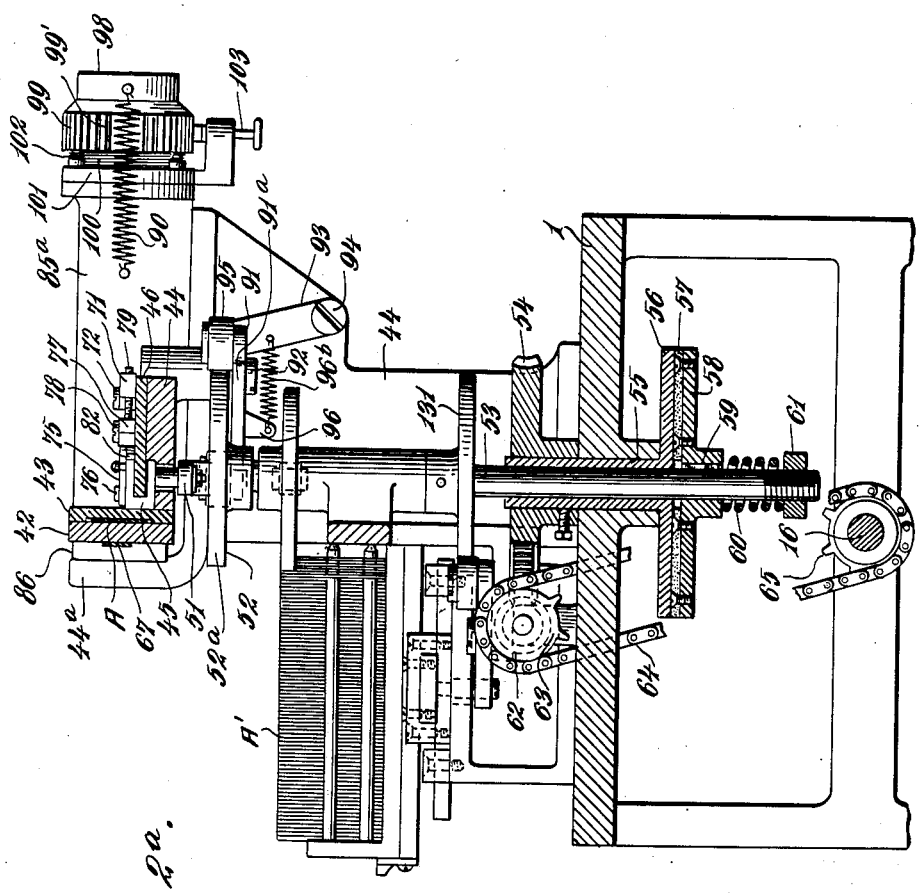

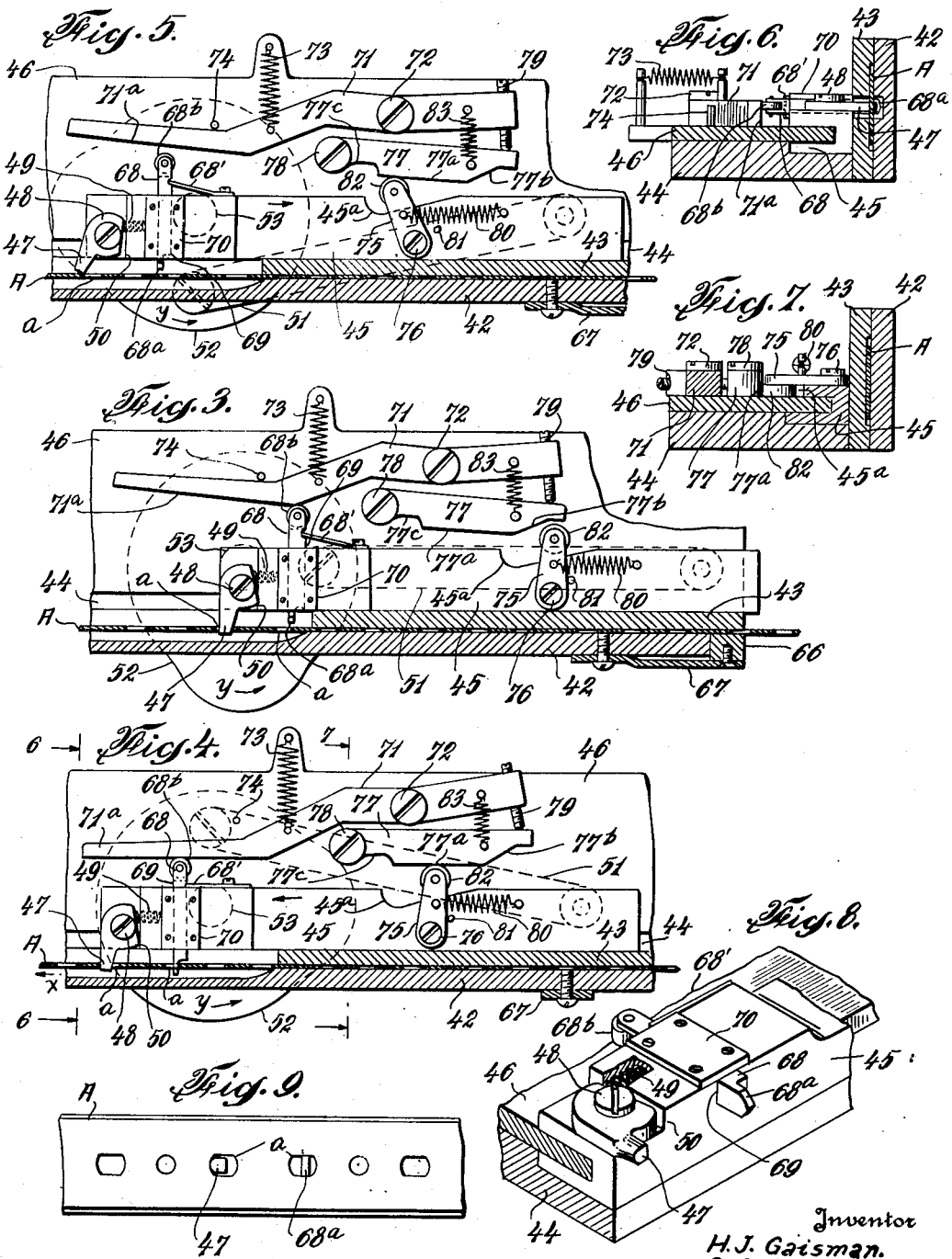

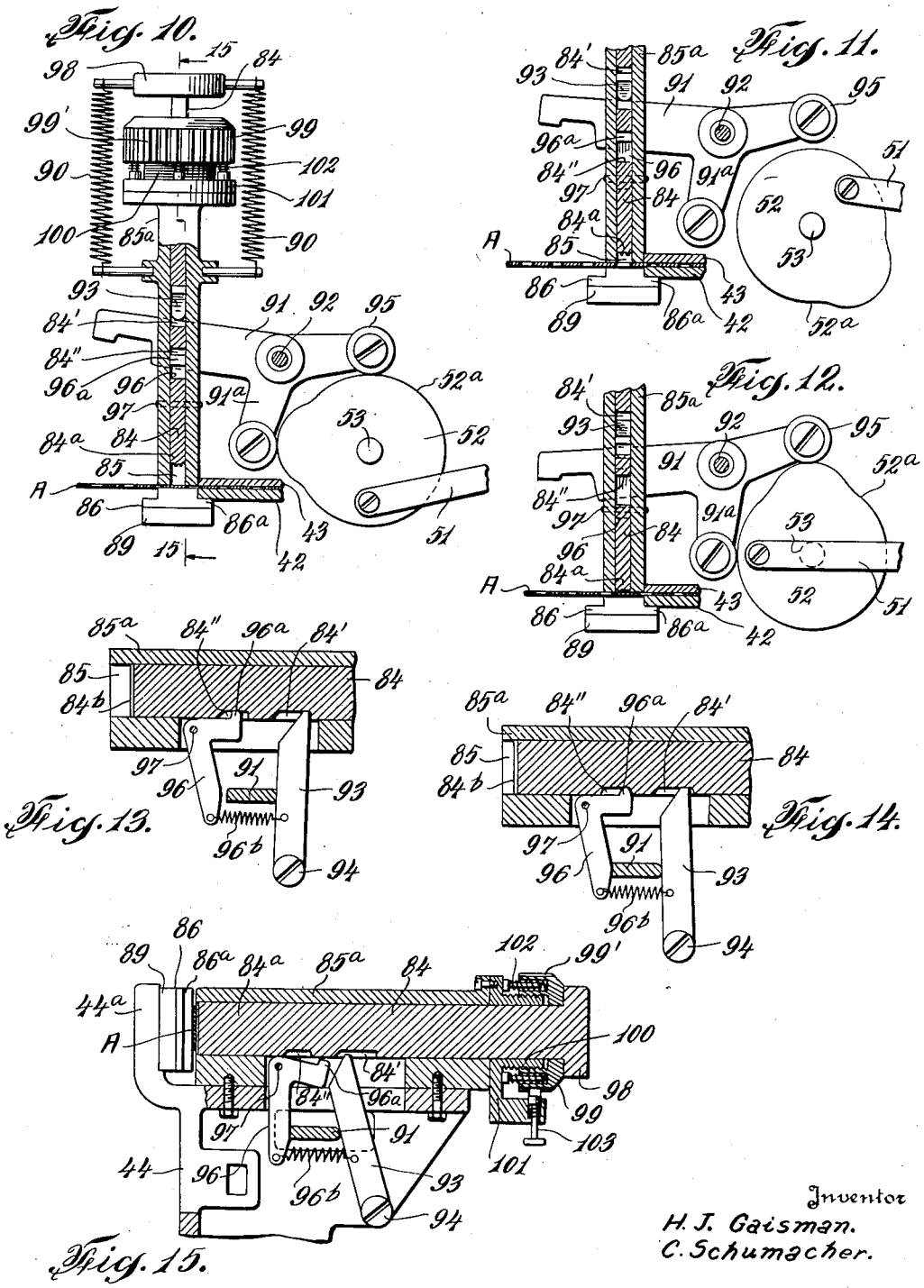

June 21, 1932.   H. J. GAISMAN ET AL   1,864,488
BLADE MAKING MACHINE
Original Filed Feb. 4, 1927    6 Sheets-Sheet 6
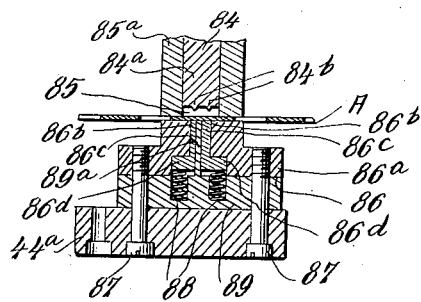
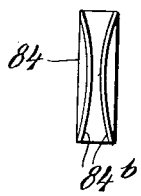
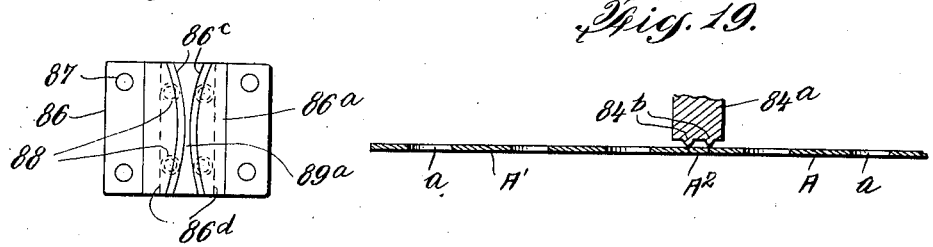
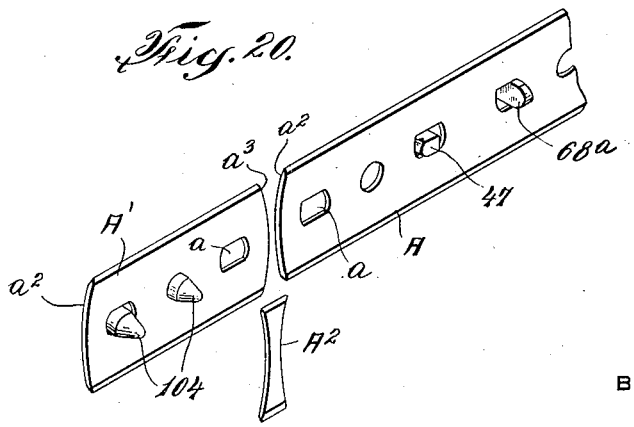
INVENTOR
H. J. Gaisman.
BY C. Schumacher.
P. F. Bourne
ATTORNEY Patented June 21, 1932

1,864,488

UNITED STATES PATENT OFFICE

HENRY J. GAISMAN, OF NEW YORK, AND CONRAD SCHUMACHER, OF LYNNBROOK, NEW YORK, ASSIGNORS, BY MESNE ASSIGNMENTS, TO GILLETTE SAFETY RAZOR COMPANY, OF BOSTON, MASSACHUSETTS, A CORPORATION OF DELAWARE

BLADE MAKING MACHINE

Original application filed February 4, 1927, Serial No. 165,903, now Patent No. 1,788,570. Divided and this application filed January 2, 1931. Serial No. 506,150.

This application is a division of our application Serial #165,903, filed February 4, 1927, now Patent No. 1,788,570, for sharpening machine.

The object of our invention is to cut off portions or pieces of desired length from a metal strip, such as for the production of safety razor blades, in a continuous manner, as the strip is fed.

The invention comprises novel details of improvement that will be more fully hereinafter set forth and then pointed out in the claims.

Reference is to be had to the accompanying drawings forming part hereof, wherein:—

Fig. 2 is a front elevation of Fig. 1;

Fig. 2a is a cross section on line 2a, 2a in Fig. 1;

Figure 1:
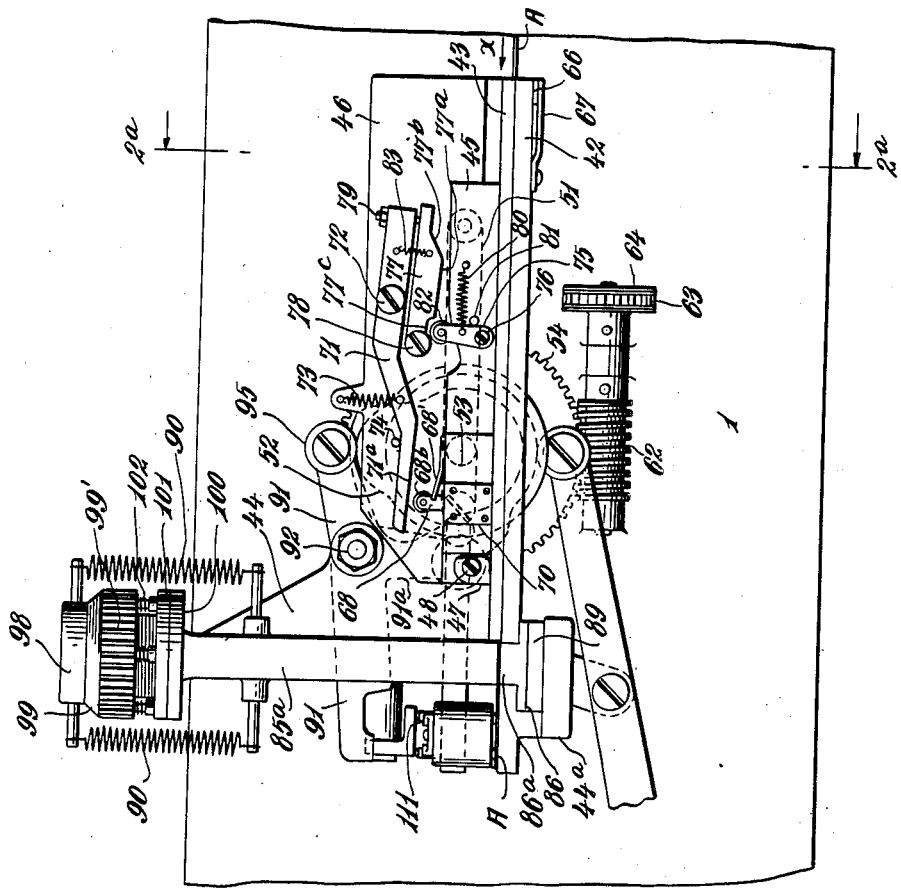
Fig. 1 is a plan view of a machine embodying our invention.

Figs. 3, 4, and 5 are detail sectional plan views of strip feeding means;

Figs. 6 and 7 are sections respectively on lines 6, 6 and 7, 7 in Fig. 4;

Fig. 8 is a perspective detail of a portion of the strip feeder;

Fig. 9 is a detail of a portion of the strip with respect to its feeding devices;

Fig. 10 is a plan view, partly in section, of the strip cutting-off devices;

Figs. 11 and 12 are sectional details illustrating parts of Fig. 10 in different positions;

Figs. 13, 14 and 15 are vertical detail sections through the cutting-off tool substantially on line 15, 15 in Fig. 10, showing the parts in different positions;

Fig. 16 is a sectional detail substantially on the plane of line 16, 16 in Fig. 2;

Fig. 17 is a detail end view of cutting-off tool;

Fig. 18 is a detail face view of the cutting-off block illustrated in Fig. 16;

Fig. 19 is a sectional detail illustrating the cutting-off tool in contact with a strip, and Fig. 20 is a perspective view illustrating a blade cut from the strip.

Similar numerals of reference indicate corresponding parts in the several views.

The numeral 1 indicates a main frame which may be of any suitable construction. At A is a perforated strip such as a strip of thin steel sharpened along its edges and having spaced perforations at $a$. The strip A may be sharpened and perforated and supplied from a reel, in any desired way. The devices to be described will feed the strip A definite distances, step by step, whereby the strip may be cut into desired lengths, such as one length for each feeding step of the strip. The strip passes between spaced guiding plates 42, 43, supported on a framing 44 on the main frame, and a reciprocative member 45 is operative along guide 43 and along a guide plate 46, (Fig. 7), supported on said framing. Member 45 is provided with a finger 47 pivoted on the member at 48 adapted to cooperate with strip A and to enter perforations therein, a spring 49 bearing against said finger and against member 45 normally tending to press the finger toward strip A, (Fig. 3). The movement of finger 47 by the spring is limited by the stop 50 on member 45, (Fig. 8). The tip end portion of finger 47 is shaped to enter apertures $a$ of strip A, (Figs. 4 and 5). Member 45 is reciprocated by means of a link 51 pivotally attached thereto and pivotally connected to a crank member 52, (shown in the form of a cam for a purpose to be described), the part 52 being shown carried by a shaft 53 journaled in suitable bearings in framing 44. Shaft 53 is rotated by the medium of frictional devices and gearing shown comprising a worm wheel 54 secured to a sleeve 55 receiving shaft 53 and provided with a friction disk 56 in engagement with a friction member 57 secured to a disk 58 surrounding shaft 53 and slidably connected therewith by a key at 59, a spring 60 on said shaft bearing against disk 58 and against a stop nut 61 on shaft 53. Worm wheel 54 is rotated by a worm 62 journaled in bearings on frame 1 and provided with a sprocket wheel 63 receiving chain 64 from a sprocket 65 on drive shaft 16.

Member 45 and finger 47 move to the left in Fig. 3 for feeding strip A, and to resist reverse motion of finger 47 along the strip a friction member or pad 66 is shown adapted to bear resiliently against a side of the strip, being mounted upon a spring 67 secured to guide plate 42. To maintain the strip A in proper position for cutting blades successively therefrom, (in addition to such sustaining of the strip as is accomplished by the finger 47), a supporting and aligning member 68 is slidably guided in a bearing 69 in member 45 and retained by plate 70 secured on said member, the operative end 68a of member 68 being shown tapering to enter the apertures a in strip A, (Figs. 1, 3, 4, 5 and 8). An arm or lever 71 is pivotally supported at 72 upon the guide plate 46 to move member 68 toward strip A. A spring 73 connecting arm 71 with plate 46 normally retains said arm against a stop pin 74 on said plate. The feeding movement of member 45, (toward the left in Figs. 3 and 4), causes operation of arm 71 to push member 68 into an aperture in strip A by means of an arm 75 pivotally supported at 76 on member 45, (Fig. 7), and operative against an arm 77 pivotally supported at 78 on plate 46 by engagement with an interposed threaded stop or screw 79 shown adjustably carried on arm 71. A spring 80 normally retains arm 75 in engagement with a stop pin 81 on member 45. The arm 75 is shown provided with an end friction roller 82 to engage the under surface 77a of arm 77, the member 45 being shown provided with a recess 45a to receive said roller 82. The arm 77 has an inclined edge 77b adapted to be engaged by roll 82 to tilt the arm and said arm is provided with a recess 77c to receive roll 82 approximately at the stopping point of member 45 on the feeding stroke. Arm 77 is normally maintained against stop 79 by means of a spring 83 connecting the arms 71 and 77.

With the parts in the inactive or retracted position shown in Fig. 3 the member 52 will rotate in the direction of the arrow y in said figure to cause member 45 to move to the left, whereupon roller 68b on member 68 will advance under the straight edge 71a of arm 71 and roller 82 will engage the inclined edge 77b of arm 77, thereby causing arm 71 to be tilted to push the end 68a of member 68 into an aperture a in strip A, with said rollers rolling along the corresponding edges 71a and 77a, the finger 47 propelling the strip while the member 68 retains the strip in required edgewise alignment. Fig. 4 illustrates the parts substantially in halfway feeding position to the left. When the full feeding stroke of member 45, carrying the strip A along terminates, the roller 82 will have entered the recess 77c in arm 77 and spring 73 will cause tilting of arms 71 and 77, as indicated in Fig. 5, spring 68' causing member 68 to move outwardly to release strip A. On the return stroke of member 45 the roller 82 will engage the right hand inclined portion of recess 77c causing arm 75 to tilt into recess 45a of member 45 so that roller 82 may ride along the edge 77a of arm 77, and the finger 47 will recede from the aperture a in strip A. Fig. 5 illustrates a substantially halfway return of member 45 and when said member reaches the stopping position of Fig. 3 the arm 75 will be released from arm 77 and spring 80 will restore arm 75 to the normal position against pin 81 with the parts ready for another feeding operation. It will be understood from the foregoing that each time that member 45 retreats from a feeding stroke the finger 47 will emerge from an aperture a in strip A and slide along the latter, and when member 45 advances on a feeding stroke said finger will enter the strip to feed it and member 68 will be projected through the strip to align and support it until the termination of the feeding stroke of member 45, the distance fed at each forward stroke of member 45 being equal to the length of steel to be cut from the strip.

The devices described illustrate a means for feeding the strip A step by step, to strip cutting-off means, and are similar to strip feeding devices set forth in a companion application to be filed by us.

A blade cutting-off tool is indicated at 84 reciprocative in a guideway 85 in a tubular member 85a supported by the framing 44 and shown located adjacent to the reciprocative feeding member 45, (Fig. 1), in such position that the operative end 84a of tool 84 may engage strip A, (Figs. 10—16). Opposing the end 84a of tool 84 is a strip resisting member or die, indicated generally at 86, shown supported by screws 87 in an arm 44a on framing 44, (Figs. 1, 15, and 16). The member or die 86 is shown comprising a block 86a containing a through bore 86b in which die members 86c are normally pressed toward tool 84 and are resiliently resisted by springs 88 shown located in recesses in a block 89 secured by screws 87 between the parts 44a and 86, (Fig. 16). The block 89 has a tongue 89a projected toward tool 84 and located between die members 86c to keep them separated. Said die members have projections or shoulders 86d pressed by the springs 88 against the metal of the corresponding block 86a to retain the forward ends of the members 86 in position to engage strip A, (Fig. 16). The operative end 84a of tool 84 is provided with spaced projecting ribs 84b opposing the die member 86c, with the strip A therebetween, ribs 84b being shown sharpened to engage the strip. The ribs 84b are shown curved with their convex portions opposing, (Fig. 17), and the operative ends of the die members 86c are correspondingly curved, (Fig. 18), the arrangement being such that when tool 84 strikes hardened strip A it will crack it to form a curved end a3 on a blade cut off and a curved end a2 on the end of strip A, which eventually becomes the curved end a2 of the blade, an intermediate piece of steel A2 from strip A being cut off. The effect of the stroke of the tool against the strip is virtually to crack or fracture the same for cutting off or severing the blade A' and the piece A2, the spring-resisting die members 86c taking the shock of the tool. To operate the tool 84 the same is connected by springs 90 with the guideway member 85a, (Figs. 1 and 10), normally tending to force the tool towards strip A. The tool is drawn away from the strip against the tension of springs 90 by means of an arm or lever 91 pivoted at 92 and operative against a finger 93 pivoted at 94 on framing 44, a free end of the finger 93 being operative in a recess 84' in the under surface of tool 84, (Figs. 13, 14 and 15). The peripheral surface 52a of member 52 is shown in the form of a cam cooperative with arm or lever 91, which is shown provided with an anti-friction roll 95 to engage the cam, for moving the arm 91 in one direction, said arm having a projection 91a extending at an angle to the plane of the arm to be engaged by said cam, whereby arm 91 will be rocked back and forth during a complete rotation of member 52, (Figs. 10, 11 and 12). A latch 96 is pivotally supported at 97 on the guideway member 85a, one end 96a of said latch being operative in a recess 84'' of tool 84. The finger 93 and latch 96 are shown connected together by a spring 96b to cause them to engage the arm 91 therebetween. When cam member 52 rotates toward the position indicated in Fig. 10 it will rock the arm 91 to cause it to push back the finger 93 which, by engaging the metal at one end of recess 84' in tool 84, will cause retraction of the tool from strip A and the end 96a of latch 96 will enter recess 84'' of the tool, (Fig. 13). During continued rotation of the cam member 52 it will operate arm 91 causing it to advance toward latch 96, (relieving the operating pressure on finger 93), and tool 84 will be temporarily retained by latch 96, under the tension of springs 90, (Fig. 14). When member 52 has rotated sufficiently arm 91 will have tilted latch 96 so that when member 52 about reaches the position substantially as shown in Fig. 12 the latch 96 will have been operated by said lever to be withdrawn from retaining the tool 84, (Fig. 15), whereby the latter will be released and springs 90 will cause the tool to strike strip A a sharp blow serving to separate blade A' from the strip and knock out the piece A2 in manner before described. The strip cutting or severing operation of tool 84 occurs each time that the feeding member 45 is brought to rest at the end of the feeding stroke. The tool 84 is shown provided with a head 98 adapted to engage a stop 99 shown adjustably secured by screw threads 100 to a fitting 101 secured at the outer end of guideway member 85a, interposed springs at 102 resisting the thrust of the tool against stop 99 at the threads 100, (Fig. 15). The stop 99 is provided with peripheral recesses 99' adapted to be engaged by a spring-pressed dog 103 to retain the stop in positions of adjustment, since said stop may be adjusted respecting head 98 to control the operation of the tool 84 against strip A.

After the blades have been cut off from the strip they will be delivered to any desired receiving place, or may be assembled on pins 104 that enter the apertures a in the portion of the strip that becomes a blade, to support the blade and move it to a blade assembling position, as by means of arm 105 pivotally supported 106 on framing 44 and provided with a gear 107 in mesh with a slidable rack 108 guided by framing 44 and operative by cam 109 on shaft 53, a spring 110 connecting rack 108 with framing 44 operating the rack in opposition to said cam, (Fig. 2), whereby for each rotation of cam 109 the arm 105 will be rocked back and forth for delivery of a blade.

Having now described our invention what we claim is:—

1. In a blade making apparatus the combination of a tool and an opposing die, said tool having spaced projecting ribs to engage a strip to cut off a blade from the strip and an intermediate piece from the strip between the blade and the remainder of the strip.

2. An apparatus as set forth in claim 1, in which the ribs are curved with their convex portions opposing for producing curved ends on the blade and the adjacent end of the strip.

3. An apparatus as set forth in claim 1, in which the die includes spaced movable die members respectively opposing the ribs of the tool, and springs cooperative with the die members to resist the thrust of the tool.

4. An apparatus as set forth in claim 1, in which the die includes spaced movable die members respectively opposing the ribs of the tool, springs cooperative with the die members to resist the thrust of the tool, and a block opposing the die members and provided with a tongue located between the die members.

5. In a blade making machine the combination of a tool, an opposing die, spring means cooperative with the tool to force it against a strip, a finger cooperative with the tool to retract it against the spring means, a latch operative with the tool to retain it in set position, and means separate from and alternately cooperative with said finger and latch to cause the finger to operate the tool and permit engagement of the latch therewith and to cause the latch and finger to release the tool for striking the strip.

6. In a blade making machine the combination of a tool, an opposing die, spring means cooperative with the tool to force it against a strip, a finger cooperative with the tool to retract it against the spring means, a latch operative with the tool to retain it in set position, means cooperative with said finger and latch to cause the finger to operate the tool for engagement of the latch therewith and to cause the latch to release the tool for striking the strip, the means that operates the finger and the latch comprising an arm cooperative with the finger and the latch, and means to rock the arm to operate the finger and the latch alternately.

7. A blade making machine as set forth in claim 6, the arm being located between the finger and the latch, and a spring connecting said finger and latch.

HENRY J. GAISMAN.
CONRAD SCHUMACHER.